(12) United States Patent
Oowatari et al.

(10) Patent No.: US 7,868,513 B2
(45) Date of Patent: Jan. 11, 2011

(54) VEHICLE A.C. GENERATOR (75) Inventors: Shinya Oowatari, Anjo (JP); Yoshinori Hayashi, Toyohashi (JP)

(73) Assignee: Denso Corporation, Kariya (JP)

( * ) Notice: Subject to any disclaimer, the term of this patent is extended or adjusted under 35 U.S.C. 154(b) by 207 days.

(21) Appl. No.: 12/230,927

(22) Filed: Sep. 8, 2008

(65) Prior Publication Data
US 2009/0079294 A1 Mar. 26, 2009

(30) Foreign Application Priority Data
Sep. 21, 2007 (JP) ............... 2007-245609

(51) Int. Cl.
*H02K 1/27* (2006.01)
*H02K 21/14* (2006.01)

(52) U.S. Cl. .................. 310/263; 310/156.72
(58) Field of Classification Search ................ 310/263, 310/156.66–156.73
See application file for complete search history.

(56) References Cited
U.S. PATENT DOCUMENTS

| | | | |
|---|---|---|---|
| 4,584,496 A * | 4/1986 | Frister ...................... | 310/60 R |
| 5,793,144 A * | 8/1998 | Kusase et al. ............... | 310/263 |
| 5,969,459 A | 10/1999 | Taniguchi et al. | |
| 6,013,967 A * | 1/2000 | Ragaly et al. ............... | 310/263 |
| 6,369,485 B1 * | 4/2002 | Oohashi et al. .............. | 310/263 |
| 6,548,935 B1 | 4/2003 | Shendi et al. | |
| 7,605,518 B2 * | 10/2009 | Nakamura ................... | 310/263 |

FOREIGN PATENT DOCUMENTS

| | | |
|---|---|---|
| JP | A-10-201149 | 7/1998 |
| JP | A-2001-078374 | 3/2001 |
| JP | A-2003-513597 | 4/2003 |

OTHER PUBLICATIONS

Japanese Office Action, Application No. 2007-245609, dated Sep. 15, 2009 (w/English translation).

* cited by examiner

*Primary Examiner*—Burton Mullins
(74) *Attorney, Agent, or Firm*—Oliff & Berridge, PLC

(57) ABSTRACT

A vehicle A.C. generator has a rotor. The rotor has a pair of pole cores and magnet holders. Each pole core has a plurality of claw-like magnet poles. Each magnet holder contains a permanent magnet and placed between the adjacent claw-like magnet poles in order to prevent leakage flux. The rotor has a pair of supporting members in order to stop each magnet holder shifting in the direction of a rotary shaft of the rotor. Each supporting member has projecting parts which correspond to the magnet holders. The supporting members are fixed to one end surface of the pole cores, respectively. Each projecting part fixes the position of the corresponding permanent magnet in the rotor.

5 Claims, 6 Drawing Sheets

VEHICLE A.C. GENERATOR

CROSS-REFERENCE TO RELATED APPLICATION

This application is related to and claims priority from Japanese Patent Application No. 2007-245609 filed on Sep. 21, 2007, the contents of which are hereby incorporated by reference.

BACKGROUND OF THE INVENTION

1. Field of the Invention

The present invention relates to a vehicle A.C. generator to be mounted into automobiles such as a passenger vehicle and a truck, and in particular, relates to an improved structure of a rotor in the vehicle A.C. generator.

2. Description of the Related Art

Vehicle A.C. generators have been well known and various types thereof are mounted to automobiles such as a passenger vehicle and a truck. Such a vehicle A.C. generator is comprised of a rotor and a stator. The rotor of the vehicle A.C. generator has a plurality of magnet poles of a pair of pole cores. The rotor has plural connecting members. Each connecting member connects and fixes a corresponding permanent magnet to an end plate of a corresponding pole core toward a rotary shaft of the rotor. In particular, the connecting member is extended from a magnet holder to an end plate connected to an end surface of the pole core toward the longitudinal direction of the magnet holder. The permanent magnet is contained in the magnet holder. For example, Japanese patent laid open publication No. JP H10-201149 has disclosed such a structure of the vehicle A.C. generator. (Pages 3 to 5, and FIGS. 1 to 15 in JP H10-201149).

On the other hand, Japanese patent laid open publication No. JP 2001-78374 has disclosed another type of the vehicle A.C. generator in which a magnet holder is placed between a pair of adjacent magnet poles, an extended part of the magnet holder is extended toward the direction of a rotary shaft of the rotor so that it projects toward an end surface of a pole core, and the part of the magnet holder serves as a cooling fan.

However, the conventional techniques of the vehicle A.C. generator described above have the following drawbacks.

In the structure of the vehicle A.C. generator disclosed in JP H10-2011489, the connecting member with which the magnet holder and the end plate are connected requires additional working steps for connecting the connecting member to the end plate of the corresponding pole core. In addition, this conventional technique requires additional components and thereby increases the number of components of the vehicle A.C. generator. As a result, the manufacturing cost of the vehicle A.C. generator is increased.

In the structure of the vehicle A.C. generator disclosed in the latter case, namely, JP 2001-78374, because a total length of the magnet holder including extended part becomes long, the strength of the extended part which serves as a cooling fan becomes low.

SUMMARY OF THE INVENTION

It is an object of the present invention to provide a vehicle A.C. generator having magnet holders and supporting members with projecting parts. Each magnet holder is placed between adjacent magnet poles of a rotor, and contains and supports a permanent magnet therein. Each supporting member has one or more projecting parts, and if necessary one or more fan parts in addition to the projecting parts. The vehicle A.C. generator is capable of maintaining the strength of the supporting member even if the fan parts and the projecting parts are formed in the supporting member.

To achieve the above purposes, the present invention provides a vehicle A.C. generator has a rotor. The rotor is comprised of a pair of pole cores, a plurality of permanent magnets, and a supporting member.

Each pole core has a plurality of claw-like magnet poles. Each permanent magnet is placed between the adjacent pole cores in a direction in order to prevent leakage flux. The supporting member is fixed to at least one of the pole cores and has plural projecting parts. When one or more of the supporting members are assembled to the rotor, each projecting part in the supporting member fixes the corresponding permanent magnet between the claw-like magnet poles in the rotor along a direction of a rotary shaft of the rotor.

The structure of the rotor in the vehicle A.C. generator according to the present invention does not require any additional components such as connecting members with which the permanent magnets are fixed between the claw-like magnet poles in the rotor. The structure of the rotor according to the present invention suppresses increasing the manufacturing cost of the vehicle A.C. generator accompanied with increasing the number of components and the assembling work.

In the vehicle A.C. generator as another aspect of the present invention, the supporting member has at least a blade part which is a part of the supporting member. The blade part rises from the supporting member at a position contacted to an end surface of the pole core in the direction of the rotary shaft. According to the present invention, the supporting member with the blade parts serves as plural cooling fans without increasing the number of additional components to be assembled into the rotor. Further, it is possible to keep the strength of the cooling fans because each cooling fan is formed by cutting and bending a part of the supporting member which is contacted to the end surface of the pole core in the direction of the rotary shaft of the rotor.

In the vehicle A.C. generator as another aspect of the present invention, the rotor further comprises a plurality of magnet holders, and each magnet holder has a shape to contact the supporting member, and contains the corresponding permanent magnet. Using the magnet holders can absorb backlash generated at the permanent magnets when the assembling accuracy of the magnet holders with the permanent magnets in the rotor is bad. It is possible to prevent the permanent magnets from being shifted toward the direction of the axial of the rotor shaft or the direction of the rotation of the rotor.

In the vehicle A.C. generator as another aspect of the present invention, grooves and stopper parts are formed in each claw-like magnet pole, and wherein the permanent magnet is inserted from an inlet part side of the claw-like magnet poles, and placed between the adjacent claw-like magnet poles through the grooves, and end surface of the permanent magnet is contacted to the stopper parts at a position which is opposite to the inlet parts of the claw-like magnet poles, and the supporting member is placed at the inlet part side of the claw-like magnet poles so that the supporting member is contacted to the end surface of the permanent magnet.

According to the present invention, it is possible to insert the permanent magnets into the claw-like magnet poles after a pair of the pole cores is assembled into the rotor. This enables the permanent magnets inserted into the claw-like magnet poles to be fixed in the direction of the rotary shaft. Still further, because the structure of the rotor according to the present invention requires one supporting member to be fitted into one pole core side, it is possible to suppress the increase of manufacturing cost of the vehicle A.C. generator.

In the vehicle A.C. generator as another aspect of the present invention, the supporting member has a structure for providing elastic force to the permanent magnets. According to the present invention, it is possible to absorb backlash generated at the permanent magnets when the assembling accuracy of the magnet holders with the permanent magnets in the rotor is bad. It is thereby possible to prevent the permanent magnets to be shifted toward the direction of the rotary shaft of the rotor.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of a vehicle A.C. generator according to a first embodiment of the present invention with reference to FIG. 1 to FIG. 5.

Figure 1:
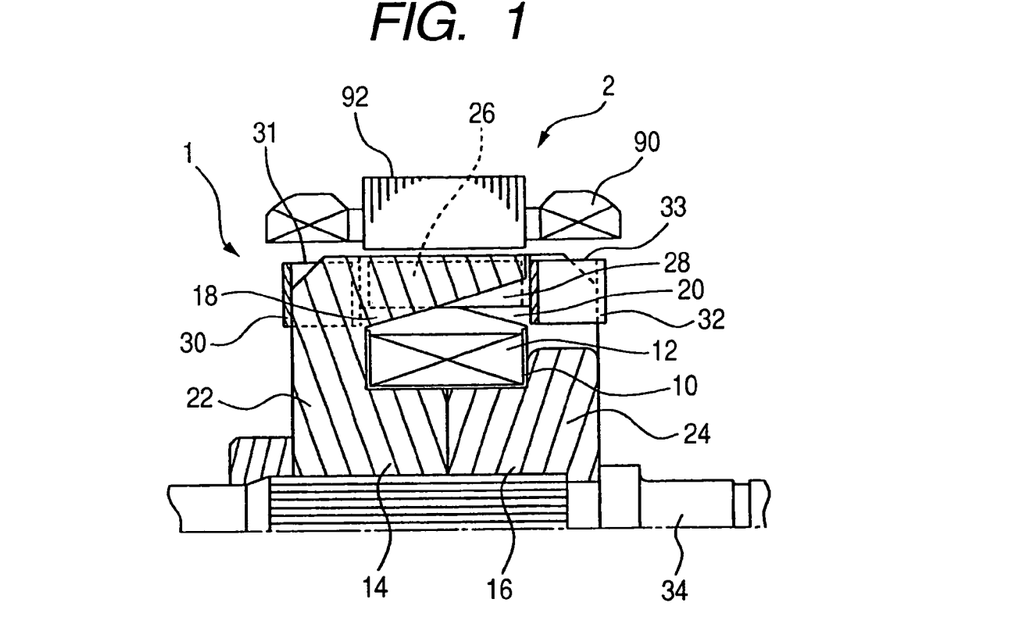
FIG. 1 is a sectional view showing a partial structure of a vehicle A.C. generator according to a first embodiment of the present invention.

FIG. 1 is a sectional view showing a partial structure of the vehicle A.C. generator according to the first embodiment of the present invention. In particular, FIG. 1 shows a Lundell type rotor 1 and a stator 2 placed at the outer periphery of the rotor 1.

As shown in FIG. 1, the rotor 1 has a field winding 12, a pair of pole cores 22 and 24, plural permanent magnets 26, and plural magnet holders 28, a pair of pole cores 22 and 24 having a plurality of claw-like magnet poles 18 and 20 (for example, each pole core has eight claw-like magnet poles), a plurality of permanent magnets 26, a plurality of magnet holders 28, supporting members 30 and 32, and a rotary shaft 34.

The field winding 12 is made of insulated copper wires which are wound around a bobbin 10 in a cylindrical shape and in a concentric configuration. Each claw-like magnet pole is extended from a corresponding core part 14 and 16 and bent at the outer periphery of the corresponding core part 14 and 16 toward the direction of the rotary shaft 34 of the rotor 1. Each permanent magnet 26 is magnetized toward the direction of protecting the space between the adjacent claw-like magnet poles 18 and 20 from leakage flux and placed between the adjacent claw-like magnet poles 18 and 20. The supporting member 30 has projecting parts 31. The supporting member 32 also has projecting parts 33. The supporting member 30 is attached onto and fixed to one end surface of the pole core 22 in the direction of the rotary shaft 34. Like the supporting member 30, the supporting member 32 is attached onto and fixed to another end surface of the pole core 24 in the direction of the rotary shaft 34. Each of the projecting parts 31 and 33 are capable of fixing the position of the permanent magnet 26 along the direction of the rotary shaft 34. The permanent magnet 26 is made of ferrite magnet, bonded magnet, or magnet of rare earth element.

Figure 2:
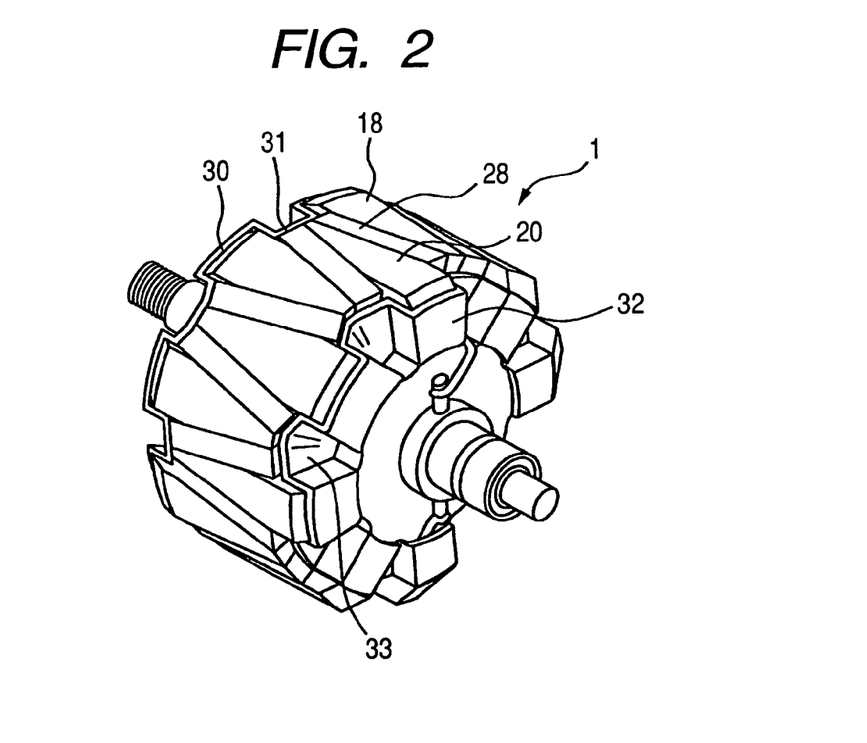
FIG. 2 is a perspective view of a rotor in the vehicle A.C. generator according to the first embodiment shown in FIG. 1.
Figure 3:
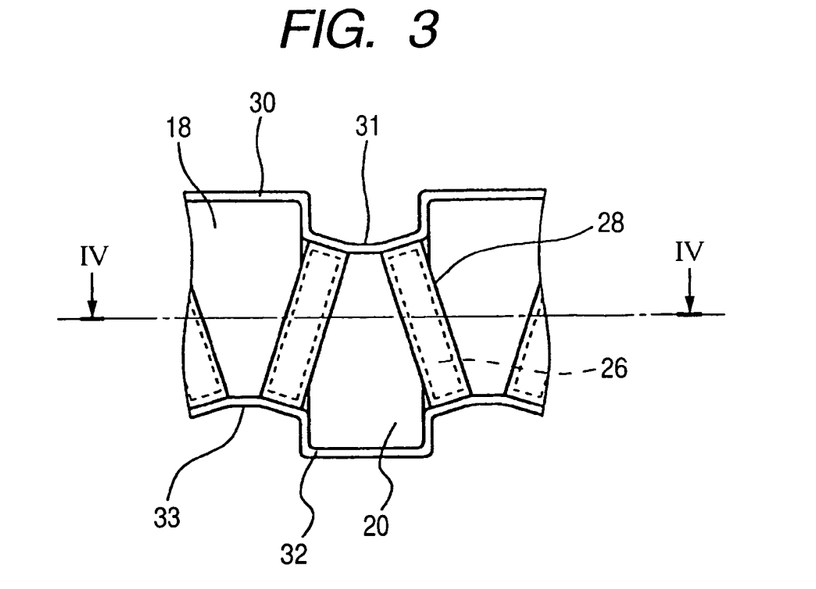
FIG. 3 is a view showing an example of fixing the magnet holder placed between adjacent claw-like magnet poles of the pole cores.

In the structure shown in FIG. 1, electrically-insulated three-phase stator winding is wound around each slot formed in a stator core 92. The stator 2 is placed with a predetermined interval from the outer periphery of the rotor 1. FIG. 2 is a perspective view of the rotor 1 in the vehicle A.C. generator according to the first embodiment shown in FIG. 1. FIG. 3 is a view showing one example of fixing the magnet holder which is placed between the adjacent claw-like magnet poles in pole cores.

As shown in FIG. 1, FIG. 2, and FIG. 3, the magnet holder 28 has a box shape and embedded in a space between the claw-like magnet poles 18 and 20 of the pole cores 22 and 24. The permanent magnet 26 is inserted through an open part which is formed in the magnet holder 28 at the inner diameter side of the rotor 1, and the permanent magnet 26 is contained in the corresponding magnet holder 26.

The magnet holder in which the permanent magnet 26 is contained is assembled into the rotor 1.

Each magnet holder 28 is made of non-magnetic material such as metal and a resin material. For example, stainless steel and aluminum is used as the metal, and nylon and PPS are used as the resin material. It is possible to cover the entire surface of the permanent magnet 26 with the magnet holder 28.

One end surface of the magnet holder 28 in the direction of the rotary shaft 28 is contacted to the projecting part 31 of the supporting member 31, and another end surface of the magnet holder 28 in the direction of the rotary shaft 34 is contacted to the projecting part 33 of the supporting member 32.

The supporting member 30 is a disk-like member attached to the end surface of one pole core 22 in the direction of the rotary shaft 34. The supporting member 30 has the plural projecting parts 31. Each projecting part 31 has a concave shape and placed between the two claw-like magnet poles 18 of the pole core 22. Between the two claw-like magnet poles 18 which are adjacent to each other through this projecting part 31, one claw-like magnet pole 20 of the pole core 24 and the two magnet holders 28 are placed. The two magnet holders 28 are placed between the claw-like magnet pole 20 and the two claw-like magnet poles 18.

The rotor 1 is assembled into the vehicle A.C. generator so that almost the entire part of one end surface of each magnet holder 28 in the direction of the rotary shaft 34 is contacted to a bottom surface of the projecting part 31.

Similarly, each supporting member 32 is also a disk-like member attached to the end surface of one pole core 24 in the direction of the rotary shaft 34. The supporting member 32 has the plural projecting parts 33. Each projecting part 33 has a concave shape and placed between the two claw-like magnet poles 20 of the pole core 24.

One claw-like magnet pole 18 of the pole core 22 and the two magnet holders 28 are placed between the two claw-like magnet poles 20 which are adjacent to each other through this projecting part 33.

The two magnet holders 28 are placed between the claw-like magnet pole 18 and the two claw-like magnet poles 20.

The rotor 1 is assembled into the vehicle A.C. generator so that almost the entire part of one end surface of each magnet holder 28 in the direction of the rotary shaft 34 is contacted to a bottom surface of the projecting part 33.

The supporting members 30 and 32 are made of a plate-shaped member such as an iron plate using press formability.

As described above in detail, according to the present invention, the rotor 1 of the vehicle A.C. generator has the supporting members 30 and 32 with the projecting parts 31 and 33. The projecting parts 31 and 33 support and fix the position of each magnet holder 28, in which the permanent magnet 26 is contained, along the direction of the rotary shaft 34. This structure of the rotor 1 does not need any connecting member in order to support each permanent magnet 26 in the magnet holder 28. As a result, the manufacturing cost of the vehicle A.C. generator can be reduced using the rotor 1 having the above structure.

Because the magnet holder 28 accommodating the permanent magnet 26 is fitted to the supporting members 30 and 32, it is possible to absorb backlash generated at the permanent magnet 26 when the assembling accuracy of the magnet holder 28 with the permanent magnet 26 in the rotor 1 is bad. It is thereby possible to prevent the permanent magnets 26 from being shifted toward the direction of the axial of the rotor shaft 34 or the direction of the rotation of the rotor 1.

Although the first embodiment discloses how to fix the magnet holder 28 in the direction of the rotary shaft 34, the present invention is not limited by this structure. For example, it is possible to combine the magnet holder 28 with various methods of fixing the magnet holder 28 in the radius direction of the rotor 1.

Figure 4:
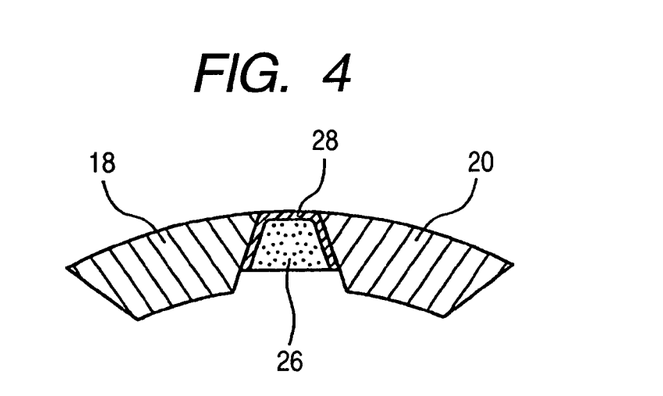
FIG. 4 is a sectional view showing a structure of the magnet holder which is placed between the adjacent claw-like magnet poles and in which a permanent magnet is contained.

FIG. 4 is a sectional view showing another structure of the magnet holder 28 which is placed between the adjacent claw-like magnet poles 18 and 20 and in which the permanent magnet 26 is contained.

As shown in FIG. 4, it can be so formed that the width of the end part of the magnet holder 28, which is measured along the rotation direction at the outside in the radius direction of the rotor 1, is narrower than that of another end part of the magnet holder 28, which is measured along the rotation direction at the outside in the radius direction of the rotor 1. In addition, both the end surfaces of the magnet holder 28 are tightly contacted in the rotational direction of the rotor 1 to the claw-like magnet poles 18 and 20. The above structure can limit shifting the magnet holders 28 toward the outside in the radius direction of the rotor 1.

Figure 5:
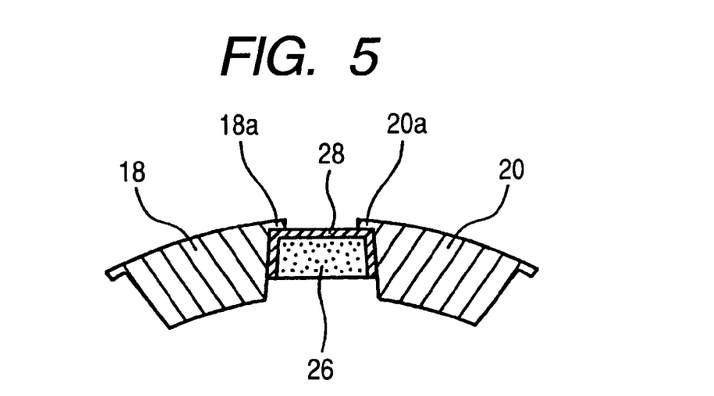
FIG. 5 is a sectional view showing another structure of the magnet holder which is placed between the adjacent claw-like magnet poles and in which a permanent magnet is contained.

FIG. 5 is a sectional view showing another structure of the magnet holder 28 which is placed between the adjacent claw-like magnet poles 18 and 20 and in which the permanent magnet 28 is contained.

As shown in FIG. 5, it can be so formed that flange parts 18a and 20a are extended from the end part of each of the claw-like magnet poles 18 and 20. That is, the width of the end part of each claw-like magnet pole shown in FIG. 5 becomes wider than that of the claw-like magnet pole shown in FIG. 4.

In the structure shown in FIG. 5, the magnet holder 28 is fixed by the flange parts 18a and 20a of the claw-like magnet poles 18 and 20. This limits the magnet holder 28 to move outside in the direction of the radius of the rotor 1.

Second Embodiment

A description will now be given of the vehicle A.C. generator according to the second embodiment of the present invention with reference to FIG. 6 to FIG. 12.

Applying the vehicle A.C. generator according to the first embodiment described above into a vehicle A.C. generator of an inner-fan type increases the total number of components of the vehicle A.C. generator because it requires additional inner cooling fans for the rotor.

The vehicle A.C. generator according to the second embodiment of the present invention can suppress increasing any additional components in the vehicle A.C. generator even if the rotor has the cooling fan function.

Figure 6:
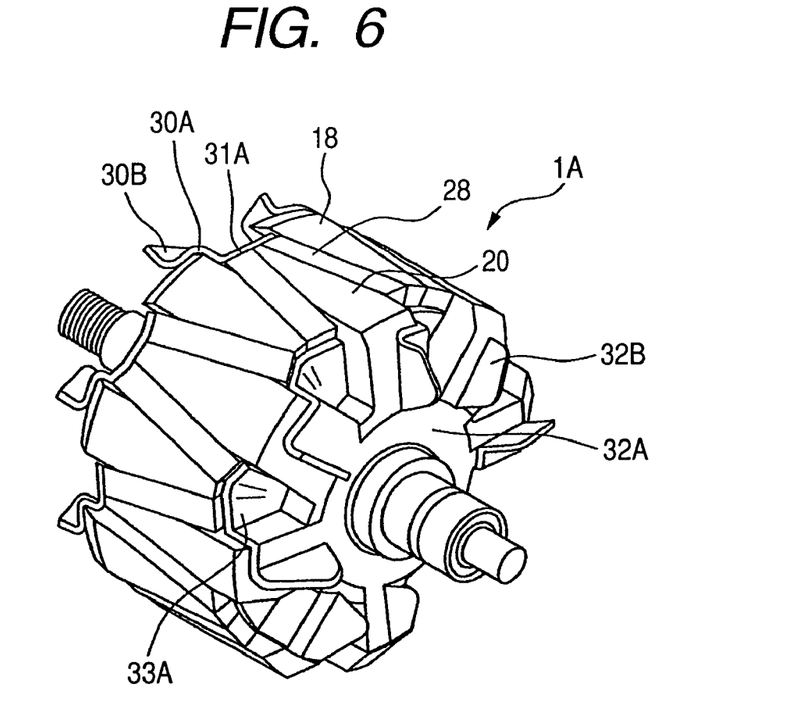
FIG. 6 is a perspective view of the rotor in the vehicle A.C. generator according to a second embodiment of the present invention.
Figure 7:
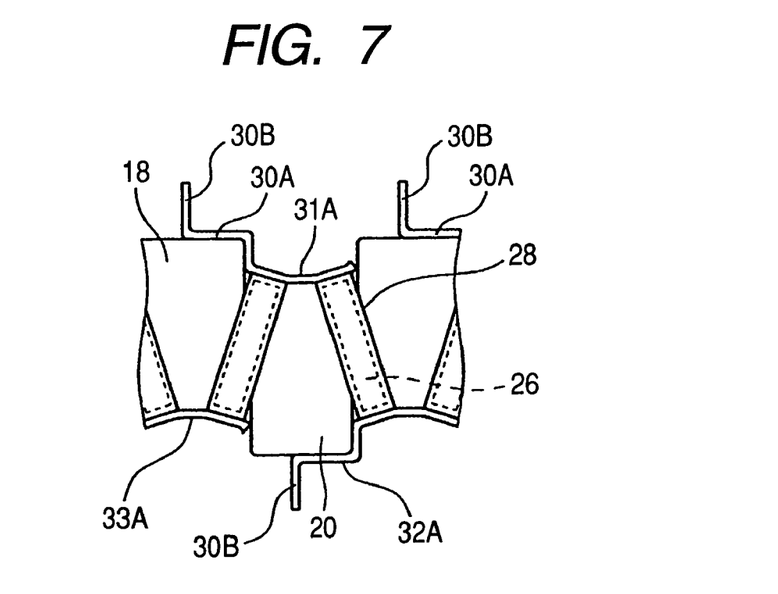
FIG. 7 is a development elevation of a part of the claw-like magnet poles at an outer periphery of the pole cores in the rotor shown in FIG. 6.

FIG. 6 is a perspective view of the rotor in the vehicle A.C. generator according to the second embodiment of the present invention. FIG. 7 is a development elevation of a part of the claw-like magnet poles at an outer periphery of the pole cores in the rotor 1A in the vehicle A.C. generator shown in FIG. 6.

The entire structure of the vehicle A.C. generator having the rotor 1A according to the second embodiment is the same as that of the vehicle A.C. generator having the rotor 1 according to the first embodiment excepting supporting members 30A and 32A.

That is, the rotor 1A in the vehicle A.C. generator according to the second embodiment uses the supporting members 30A and 32A instead of the supporting members 30 and 32.

The supporting member 30A is a disk-like member attached to the end surface of one pole core 22 in the direction of the rotary shaft 34. The supporting member 30A has plural projecting parts 31A. Each projecting part 31A has a concave shape and placed between the two claw-like magnet poles 18 which are adjacent. Between the two claw-like magnet poles 18 which are adjacent to each other through this projecting part 31A, one claw-like magnet pole 20 of the pole core 22 and the two magnet holders 28 are placed. The two magnet holders 28 are placed between the claw-like magnet pole 20 and the two claw-like magnet poles 18.

In particular, the supporting member 30A has a plurality of blade parts 30B shown in FIG. 6 and FIG. 7. Each blade part 30B is made by cutting a part of the supporting member 30A at the end surface side of the pole core 22 and by bending the part toward the circumference direction of the rotor 1A. The plural blade parts 30B serves as cooling fans during the operation of the rotor 1A.

In the structure of the vehicle A.C. generator according to the second embodiment shown in FIG. 6, each blade part 30B corresponds to each of the claw-like magnet poles 18. However, the concept of the present invention is not limited by the structure of the rotor 1A. For example, it is possible to increase or decrease the total number of the blade parts 30B according to the cooling capability of the blade parts 30B as the cooling fan which is required by the type of the vehicle A.C. generator.

Similarly, the supporting member 32A is a disk-like member attached to the end surface of the other pole core 24 in the direction of the rotary shaft 34. The supporting member 32A has plural projecting parts 33A.

Each projecting part 33A has a concave shape and is placed between the two claw-like magnet poles 18 which are adjacent to each other.

One claw-like magnet pole 20 of the pole core 24 and the two magnet holders 28 are placed between the two claw-like magnet poles 18 which are adjacent through this projecting part 33A. The two magnet holders 28 are placed between the claw-like magnet pole 20 and the two claw-like magnet poles 18.

In particular, the supporting member 32A has a plurality of blade parts 32B shown in FIG. 6 and FIG. 7. Each blade part 32B is made by cutting a part of the supporting member 33A at the end surface side of the pole core 24 and by bending the part toward the circumference direction of the rotor 1A. The plural blade parts 32B serves as cooling fans during the operation of the rotor 1A.

In the structure of the vehicle A.C. generator according to the second embodiment shown in FIG. 6 and FIG. 7, each blade part 32B corresponds to each of the claw-like magnet poles 18. However, the concept of the present invention is not limited by the structure of the rotor 1A. For example, it is possible to increase or decrease the total number of the blade parts 32B according to the cooling capability of the blade parts 32B as the cooling fan which is required by the type of the vehicle A.C. generator.

According to the structure of the rotor 1A in the vehicle A.C. generator shown in FIG. 6 and FIG. 7, it is possible to serve as the cooling fans the blade parts 30B and 32B which are parts of the supporting members 30A and 32A. Still further, because the parts of the supporting members 30A and 32A are bent toward the direction of the rotary shaft of the rotor 1A at the parts contacted to the pole cores 22 and 24 in order to form the blade parts 30B and 32B, not using additional parts to be contacted to the supporting members 30A and 32A, it is possible to easily maintain a necessary strength of the blade parts 30B and 32B.

(Modification)

Figure 8:
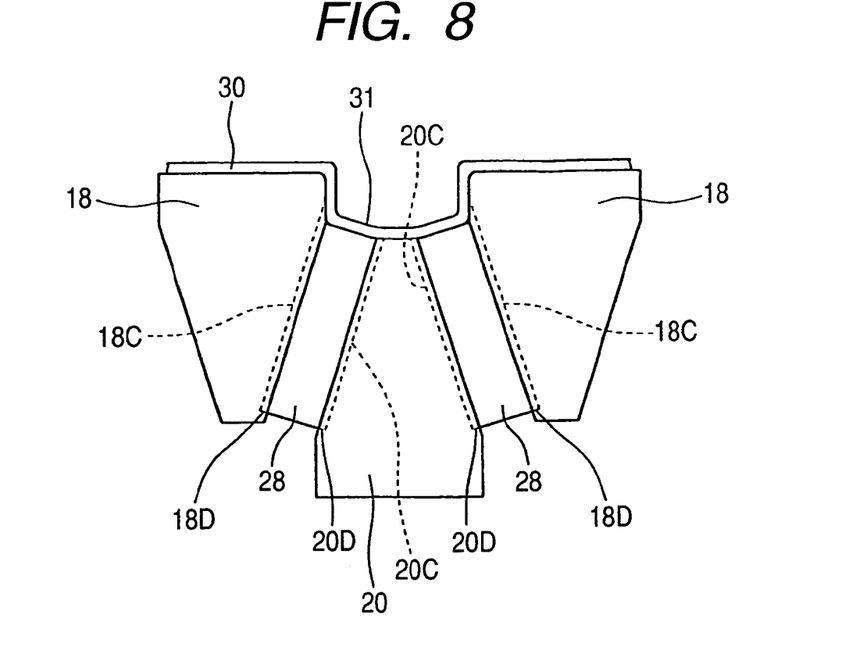
FIG. 8 is a development elevation of a part of the claw-like magnet poles at an outer periphery of the pole cores in the rotor as another example.

FIG. 8 is a development elevation of a part of the claw-like magnet poles at the outer periphery of the pole cores in the rotor as a modification. The structure shown in FIG. 8 corresponds to the structure shown in FIG. 3.

The rotor 1B as a modification shown in FIG. 8 has the supporting member 30 for one pole core 22. However, the supporting member is not placed for the other pole core 24.

Specifically, grooves 18C and 20C are formed in the claw-like magnet poles 18 and 20, respectively, as shown in FIG. 8. The grooves 18 are formed at the both ends of the claw-like magnet poles 18. Similarly, the grooves 20 are formed at both ends of the claw-like magnet poles 20. The magnet holder 28 is inserted from the supporting member 30 side, and then placed between the claw-like magnet poles 18 and 20. Still further, stopper parts 18D and 20D are formed at the opposite end part of the claw-like magnet poles 18 and 20 in order to contain the magnet holder 28 at a desired position.

In the modification shown in FIG. 8, because those stopper parts 18D and 20D only have the function of stopping the magnet holder 28 at the desired position, a step-shaped part is formed in each claw-like magnet pole as the stopper parts 18D and 20D.

The magnet holder 28 is inserted into the space between the groove 18C formed in the claw-like magnet pole 18 and the groove 20C of the claw-like magnet pole 20 until the front end part of the magnet holder 28 reaches the stopper parts 18D and 20D. After this, the projecting part 31 of the supporting member 30 is fitted to the claw-like magnet poles 18 and 20 so that the projecting part 31 is contacted to the end surface of the magnet holder 28 in the direction of the rotary shaft of the rotor 1 at the inserting side of the magnet holder 28. This can completely fix the magnet holder 28 in the direction of the rotary shaft of the rotor 1.

Adopting the above structure of the rotor can insert the magnet holder 28 with the permanent magnet 26 therein into the space between the claw-like magnet poles 18 and 20 after completion of assembling a pair of the pole cores 22 and 24. Further, the magnet holder 28 is fixed in the direction of the rotation of the rotor. Still further, because the supporting member 30 is fitted only at the one pole core 22 side, it is possible to decrease the manufacturing cost of the rotor in the vehicle A.C. generator when compared with that of the rotor in the vehicle A.C. generator shown in FIG. 1.

Figure 9A:
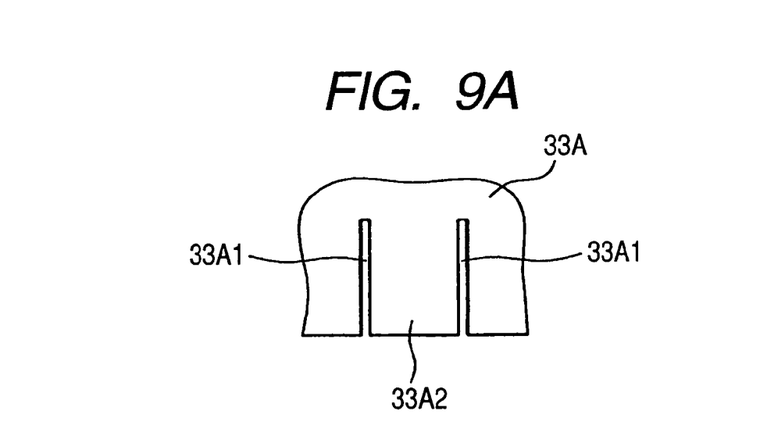
FIG. 9A and FIG. 9B, each shows a structure of a supporting member with an elastic strength.
Figure 9B:
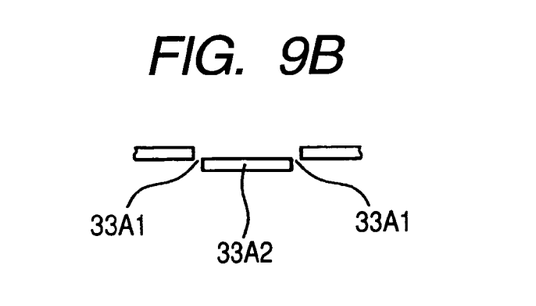

FIG. 9A and FIG. 9B, each shows a structure of the supporting member with an elastic strength. FIGS. 9A and 9B shows only a part of the facing surface 33A of the projecting part 33 of the supporting member 32 shown in FIG. 2. The projecting part 33 is contacted to the end surface of the magnet holder 28 (omitted from FIG. 9A and FIG. 9B) in the direction of the axial of the rotor shown in FIG. 2.

The facing surface 33A has two slits 33A1 and a plate part 33A2. The two slits 33A1 extend from the outer radius side to the inner radius side. The plate part 33A2 is formed between the two slits 33A1. A front end part of the plate part 33A2 is projected toward the magnet holder 28 side around the bottom part of the plate part 33A2 when no stress is applied in the direction of the rotary shaft of the rotor. When a stress is applied from the magnet holder 28 side, the reaction force is generated in the plate part 33A2. That is, the plate part 33A2 has a structure of an elastic capability.

When the supporting member 30 is assembled into the rotor, the plate part 33A2 is contacted to the end surface if the magnet holder 28 in the direction of the rotary shaft of the rotor in order to apply the elastic force toward the direction of the magnet holder 28 side. It is thereby possible to absorb backlash generated at the permanent magnet 26 or the magnet holder 28 when the assembling accuracy of the magnet holder 28 with the permanent magnet 26 in the rotor 1 is bad. It is still further possible to prevent the magnet holder 28 with the permanent magnet 26 from being shifted toward the direction of the rotary shaft of the rotor.

Figure 10A:
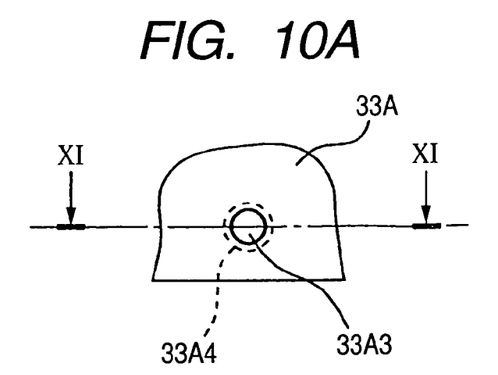
FIG. 10A and FIG. 10B, each shows another structure of the supporting member with an elastic strength.
Figure 10B:
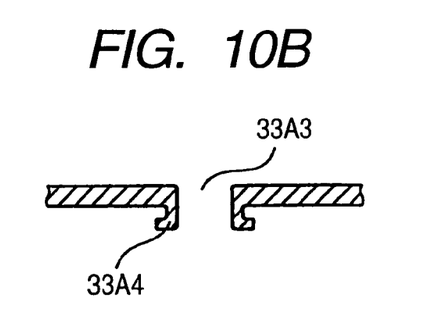

FIG. 10A and FIG. 10B, each shows another structure of the supporting member with an elastic strength.

FIG. 10A and FIG. 10B show the same part of the facing surface corresponding to the facing surface 33A shown in FIG. 9A and FIG. 9B. The facing surface 33A shown in FIG. 10A and FIG. 10B has a penetration hole 33A3 therein. The penetration hole 33A3 has a cylindrical projecting part 33A4 formed around the penetration hole 33A3 toward the direction of the magnet holder 28 side (omitted from FIG. 10A and FIG. 10B).

Because the cylindrical projecting part 33A4 has a structure with a flexible function (for example, the front end part thereof has a thin thickness), it is easily deformed by receiving stress.

When the supporting member 30 is assembled into the rotor, the cylindrical projecting part 33A4 is contacted to the end surface of the magnet holder 28 toward the direction of the rotary shaft 34 of the rotor, and the elastic force is applied to the magnet holder 28 side. It is thereby possible to absorb backlash generated at the permanent magnet 26 or the magnet holder 28 when the assembling accuracy of the magnet holder 28 with the permanent magnet 26 in the rotor is bad. It is still further possible to stop the magnet holder 28 with the permanent magnet 26 shifting toward the direction of the rotary shaft of the rotor.

The concept of the present invention is not limited by the above embodiments and modifications. It is possible to modify the structure of the rotor within the concept of the present invention.

For example, the first and second embodiments use the magnet holder 28 of a rectangular prism shape with a simple structure, and the bottom surface of each of the projecting parts 31 and 33 is deformed so that the magnet holder 28 is easily inserted and fitted to the end surface of the projecting parts 31 and 33 in the direction of the rotary shaft 34. However, it is possible to deform the shape of the magnet holder 28 and the projecting parts 31 and 33 have a simple structure.

Figure 11:
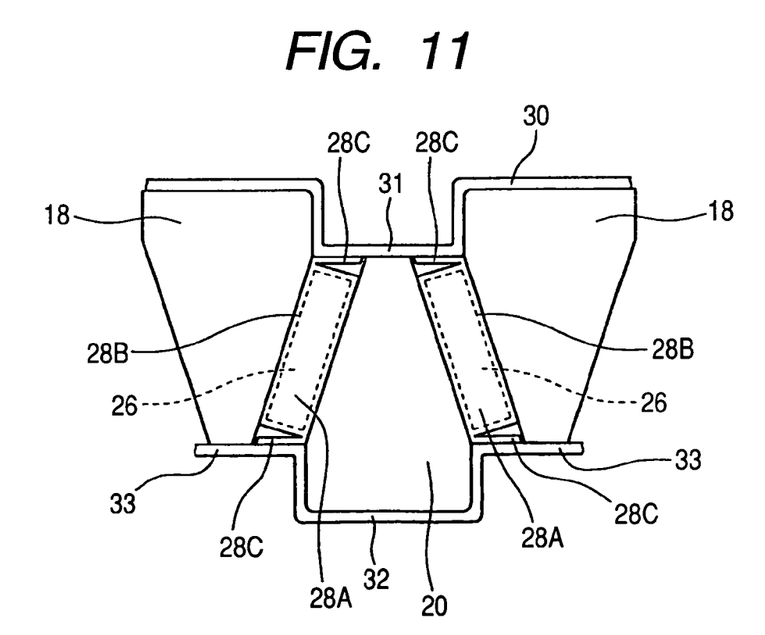
FIG. 11 is a view showing another structure of the magnet holder to be used in the rotor of the vehicle A.C. generator.

FIG. 11 is a view showing another structure of the magnet holder 28A. The magnet holder 28A shown in FIG. 11 has a rectangle prism part 28B which contains the permanent magnet 26 of a rectangle prism shape therein and a pair of plate parts 28C. The plate parts 28C are connected to both the end parts of the magnet holder 28A in the direction of the rotary shaft 34 (omitted from FIG. 11). The rectangle prism part 28B and the plate parts 28C are formed in one assembled body.

The pair of plate parts 28C in each magnet holder is so formed that the angle of each plate part 28C corresponds to the shape of the bottom surface (having the plate shape in the case shown in FIG. 11) of the projecting part 31 when the magnet holder 28A is assembled into the rotor.

Like the plate part 33A in the case shown in FIG. 9, it is possible to form the plate parts 28C with a desired angle to the projecting part 31 so that the elastic force is generated by the plate part 28C when the plate part 28C contacts to the projecting part 31.

Figure 12:
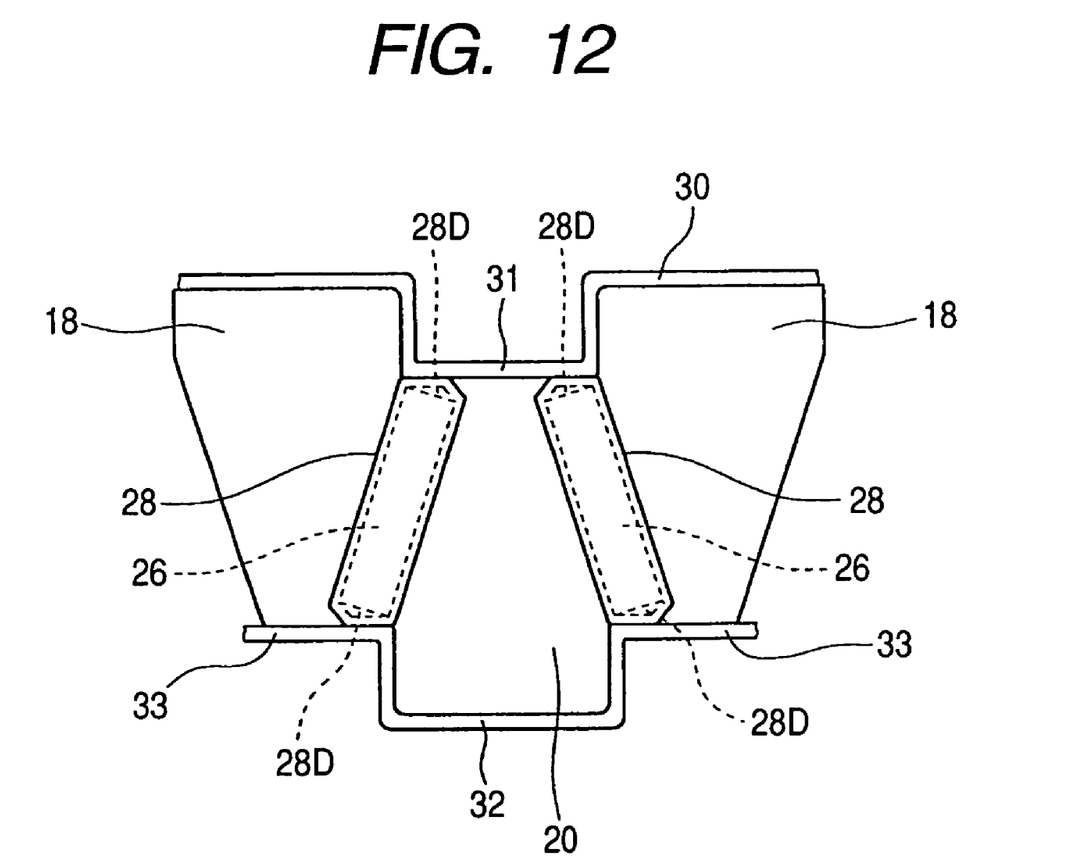
FIG. 12 is a view showing another structure of the magnet holder to be used in the rotor of the vehicle A.C. generator.

FIG. 12 is a view showing another structure of the magnet holder.

Similar to the embodiment and modifications above, the magnet holder 28 shown in FIG. 12 contains the permanent magnet 26 therein. In particular, the magnet holder 28 shown in FIG. 12 has a space 28D of a predetermined size therein. The plate-shaped bottom surface of the projecting part 31 is contacted to the end surface of the magnet holder 28.

In the above embodiments and modifications, the permanent magnet 26 is contained in the magnet holder 28 and assembled into the rotor. It is also possible to incorporate the permanent magnet 26 directly into the rotor without using the magnet holder.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A vehicle A.C. generator comprising a rotor which comprises:
  a pair of pole cores, each having a plurality of claw-like magnet poles;
  a plurality of permanent magnets, each of the permanent magnets being placed between the pole cores in a direction to prevent leakage flux;
  a supporting member fixed to the pole cores, having projecting parts, and each of the projecting parts having a concave shape and being placed between adjacent claw-like magnet poles so that each of the projecting parts fixes the corresponding permanent magnet along a direction of a rotary shaft of the rotor; and
  a plurality of magnet holders, each of the magnet holders containing the corresponding permanent magnet therein, and being in contact with the projecting parts,
  wherein the claw-like magnet poles have grooves and stopper parts, each of the magnet holders with the corresponding permanent magnet is inserted along the grooves and a front end part of the magnet holder contacts with the stopper parts formed in the claw-like magnet poles when the magnet holders are fit to the claw-like magnet poles, and
  wherein the supporting member is placed at an end part side of the claw-like magnet poles through which the magnet holder is inserted along the grooves.

2. The vehicle A.C. generator according to claim 1, wherein the supporting member has blade parts formed at a part of the supporting member so that the blade parts rise from the supporting member at a position contacted to an end surface of the pole core in the direction of the rotary shaft.

3. The vehicle A.C. generator according to claim 1, wherein the supporting member has a structure for providing elastic force to the magnet holders.

4. The vehicle A.C. generator according to claim 1, wherein the rotor has a pair of the supporting members and a pair of the pole cores, and wherein one supporting member is fit to an end surface of one pole core and the other supporting member is fit to an end surface of the other pole core.

5. The vehicle A.C. generator according to claim 2, wherein each of the blade parts corresponds to each permanent magnet.

* * * * *